United States Patent [19]

Chittenden

[11] 4,268,007

[45] May 19, 1981

[54] VALVE ACTUATING EQUIPMENT

[76] Inventor: Jeremy B. Chittenden, Lytes Cary Manor, Lytes Cary, Somerton, Somerset, England

[21] Appl. No.: 816,203

[22] Filed: Jul. 15, 1977

[30] Foreign Application Priority Data

| | | | |
|---|---|---|---|
| Jul. 22, 1976 | [GB] | United Kingdom | 30489/76 |
| Feb. 9, 1977 | [GB] | United Kingdom | 5328/77 |
| Feb. 9, 1977 | [GB] | United Kingdom | 5329/77 |
| Jun. 23, 1977 | [GB] | United Kingdom | 26321/77 |

[51] Int. Cl.[3] .................... F16K 31/02; F16K 31/122

[52] U.S. Cl. .................................... 251/30; 91/4 R; 60/591; 60/576; 60/582; 251/57

[58] Field of Search ................ 60/542, 543, 544, 547, 60/571, 572, 538, 540, 591, 592, 593, 576, 581, 582; 251/29, 30, 54, 57, 62, 63; 285/134 R, 137 R; 91/4 R

[56] References Cited

U.S. PATENT DOCUMENTS

| | | | |
|---|---|---|---|
| 1,918,424 | 7/1933 | Pontow et al. | 60/571 |
| 2,036,342 | 4/1936 | Loweke | 60/576 |
| 2,403,912 | 7/1946 | Doll | 60/538 |
| 2,580,353 | 12/1951 | Hunt | 60/540 |
| 2,691,962 | 10/1954 | Johnson | 60/538 |
| 2,949,894 | 8/1960 | Hewitt | 91/4 R |
| 2,955,427 | 10/1960 | Porkert | 60/577 |
| 2,970,655 | 2/1961 | Acton | 60/593 |
| 3,005,444 | 10/1961 | Steibel | 60/593 |
| 3,059,433 | 10/1962 | Hirsch | 60/576 |
| 3,182,971 | 5/1965 | Wakeman et al. | 251/57 |
| 3,256,690 | 6/1966 | Smith et al. | 60/592 |
| 3,286,311 | 11/1966 | Rhoads | 91/4 R |
| 3,494,027 | 2/1970 | Harelson | 91/4 R |
| 3,507,189 | 4/1970 | Beckett et al. | 91/4 R |
| 3,646,833 | 3/1972 | Watson | 60/593 X |
| 3,767,234 | 10/1973 | Weirich et al. | 285/137 R |
| 3,978,884 | 9/1976 | Sundstrom | 251/285 |
| 4,024,884 | 5/1977 | Prescott et al. | 251/57 |
| 4,043,533 | 8/1977 | Cowley | 251/57 |

FOREIGN PATENT DOCUMENTS

| | | | |
|---|---|---|---|
| 414780 | 8/1934 | United Kingdom . | |
| 532980 | 2/1941 | United Kingdom | 60/591 |
| 750185 | 6/1956 | United Kingdom . | |
| 750546 | 6/1956 | United Kingdom . | |
| 814308 | 6/1959 | United Kingdom . | |
| 826304 | 12/1959 | United Kingdom . | |
| 836365 | 6/1960 | United Kingdom . | |
| 874515 | 8/1961 | United Kingdom . | |
| 910866 | 11/1962 | United Kingdom . | |
| 927600 | 5/1963 | United Kingdom . | |
| 1078624 | 8/1967 | United Kingdom | 60/576 |
| 1175520 | 12/1969 | United Kingdom . | |
| 1212510 | 11/1970 | United Kingdom . | |
| 1228089 | 4/1971 | United Kingdom . | |
| 1238269 | 7/1971 | United Kingdom . | |
| 1254324 | 11/1971 | United Kingdom . | |
| 1392418 | 4/1975 | United Kingdom . | |
| 1417299 | 12/1975 | United Kingdom . | |
| 1495849 | 12/1977 | United Kingdom . | |

*Primary Examiner*—Martin P. Schwadron

*Assistant Examiner*—C. L. Walton

*Attorney, Agent, or Firm*—Cushman, Darby & Cushman

[57] ABSTRACT

Actuating equipment for a gate valve or penstock uses both compressed air and hydraulic oil to obtain the advantages of both. A control valve directs air to a hydraulic reservoir so as to drive oil at the air pressure into one chamber of a double acting cylinder and piston connected to the gate. When the gate is not being moved it is locked in position by an air operated valve preventing oil flow. A normally energized solenoid operated control valve opens when electrical power fails so as to direct stored air from a reservoir to move the gate to a fail-safe position.

Air pipelines may provide communication over some distance from the control valves to the gate valve or penstock. This can avoid running electric cable through a hazardous environment, while to give fail-safe operation in the event of damage to the pipelines, these are placed within a larger bore line supplying air to hold closed an air operated valve, which, in the event of loss of pressure in this line opens so that stored air moves the gate to its fail-safe position and also operates a valve preventing movement away from that position.

Means are provided to apply an enhanced force to the gate for part of its travel.

18 Claims, 12 Drawing Figures

VALVE ACTUATING EQUIPMENT

BACKGROUND OF THE INVENTION

1. Field of the Invention

The invention relates to actuating equipment for valves having a reciprocally moveable gate for blocking the flow path, such as gate valves, penstocks and the like.

2. Description of the Prior Art

Gate valves and penstocks have customarily been fitted with handwheels to turn screwed rods connected to the valve gate. Devices to render operation faster and/or less laborious, or to provide for remote operation are known, for example hydraulic actuators are disclosed in U.S. Pat. Nos. 3,226,078, 3,111,298 and 3,086,745.

Fluid driven devices are well suited to the operation of gate valves and penstocks since they generate reciprocating motion directly by means of a piston and cylinder. However, known devices utilise only a single fluid, either compressed gas or hydraulic oil and both fluids have disadvantages. Compressed gas piston and cylinders generally operate with an uncontrolled rapidity and are inherently unsuited to moving the gate of a valve or penstock over less than its full travel. Because of its resilience compressed gas would not hold a gate firmly.

Equipment handling hydraulic oil tends to be dirty and is messy to maintain—especially where dismantling is required—leading to greater maintenance costs and longer maintenance downtimes. Remote operation requires electrical equipment and runs of electric cable which may need to be protected from its environment or which may itself represent a hazard.

Electro-mechanical actuators remain in use, presumably because of the above mentioned or other disadvantages of fluid driven devices. One device which has been introduced (in the United Kingdom at least) provides an indication of the level of elaboration and complexity which is at present regarded as acceptable. This device has an electric motor to turn the screwed rod of the valve or penstock, but the motor is not fixedly mounted. Instead it is part of an assembly carried on the screwed rod. Movement of the assembly is opposed by springs which are sufficient to restrain it against the motor torque only as long as the gate of the valve or penstock continues to move. When the gate reaches the end of its travel the motor assembly moves on the screwed rod, and its motion is detected by limit switches which turn off the motor. Should a limit switch fail to function the motor assembly would screw itself off the screwed rod, or stall when it reaches an obstruction to its further movement with concomitant overloading of the motor.

Subsequent to making the present invention the applicant has become aware of proposals for equipment which supplies compressed gas to an oil reservoir to pressurize hydraulic oil to the pressure of the gas. None of these proposals, however, has anything to do with the actuation of gate valves or penstocks; they occur in other arts. U.K. Specification Nos. 1,202,913 and 1,321,291 relate to landing gear for vehicle semitrailers; U.K. Specification No. 1,392,418 is concerned with apparatus for moving an X-ray generator; U.S. Pat. Nos. 2,573,993 and 2,403,912 relate to hydraulic presses, in the latter specification there is disclosure of using compressed air to raise oil to the air pressure to move the press and subsequently to an enhanced pressure to complete the press stroke, and U.S. Pat. No. 3,370,824 describes a ladle for molten metal which carries a supply of compressed gas to drive a hydraulic oil pump for actuating a stopper rod constituting a valve for the molten metal.

SUMMARY OF THE INVENTION

The present invention provides actuating equipment for a valve having a reciprocally movable gate, said equipment comprising:

- at least one cylinder and piston mechanically connectable to the gate of the valve, said at least one cylinder and piston providing first and second cylinder chambers;
- a first hydraulic liquid reservoir; liquid conduit means connecting said first hydraulic liquid reservoir to said first chamber;
- a gas inlet for the supply therethrough of compressed gas to said equipment;
- control means for said compressed gas; gas conduit means connecting said gas inlet to said control means and connecting said control means to said first hydraulic liquid reservoir; and
- pressure transmitting means connecting said control means to said second chamber;

said control means being selectively operable to permit passage of compressed gas to said first hydraulic liquid reservoir to pressurize it and thereby deliver liquid to said first chamber to pressurize said first chamber, and to permit passage of compressed gas to said pressure transmitting means to pressurize said second chamber, pressurization of said first chamber inducing movement of said at least one piston relative to said at least one cylinder to move the gate in one direction and pressurization of said second chamber inducing movement of said at least one piston relative to said at least one cylinder to move the gate in the reverse direction.

The second cylinder chamber may be pressurized with either gas or hydraulic liquid. In the former case the pressure transmitting means can merely be gas conduit means for delivering gas to the second chamber. In the latter case the pressure transmitting means preferably comprises a second hydraulic liquid reservoir, gas conduit means connecting said control means to said second hydraulic liquid reservoir, and liquid conduit means connecting said second hydraulic liquid reservoir to said second chamber for delivering hydraulic liquid to said second chamber.

Preferably the said at least one cylinder and piston is a double acting cylinder and piston, the first and second cylinder chambers then being the two chambers of the double acting cylinder and separated from each other by its piston.

It is an object of the present invention to provide actuating equipment for a gate valve or penstock which utilises both compressed gas and hydraulic liquid—such as hydraulic oil—so as to obtain the advantages of both. The use of hydraulic liquid allows movement of the gate through part only of its travel if desired and also allows movement at a controlled rate (although this can be quite fast if desired). The use of compressed gas allows the control gear of the equipment to be simple and clean, and the hydraulic system to be kept as a small system involving few parts. Compressed gas lines can provide the communication between actuating equipment at the gate valve and control equipment at a remote location. This can be of particular advantage when it obviates the need to run electric cable through a hazardous environment. Compressed gas represents an elegantly simple method of storing energy and can be used to provide a reserve of energy e.g. to ensure that a valve or penstock can be moved to a safe position even if the power supply should fail.

It is another object of the invention to provide actuating equipment which can hold the gate of a valve or penstock in a desired position. The invention accomplishes this by liquid valve means closing off at least one liquid filled chamber of the piston and cylinder to prevent movement of liquid. To hold the gate against gravity it may be sufficient merely to prevent flow in a single direction, e.g. return flow from the chamber to the reservoir. The liquid valve means is preferably operable by gas pressure to open it automatically upon operation of the equipment in such a manner as to require liquid flow which the liquid valve means normally prevents.

The equipment may provide solely for manual control at the site of the penstock or gate valve, in which case all the equipment may be an assembly mounted on a common supporting structure. It may provide solely for remote cooperation, in which case the cyliner and piston, the or each hydraulic liquid reservoir and the liquid valve means (if any) may be mounted on a common supporting structure above the gate and the control means connected to this assembly by air lines. The equipment may include (as part of such an assembly) manual control means at the site of the penstock or gate valve, and also have control means remote from the assembly and connected to it by air lines.

Automatic operation may be provided, using at least one solenoid operated valve in the, or one of the, control means. Automatic operation may use control means remote from the penstock or gate valve. A pair of solenoid operated valves is preferred, operation of one solenoid operated valve delivering gas to the first hydraulic liquid reservoir to pressurize it and thereby deliver hydraulic liquid to the said first cylinder chamber to move the gate in one direction, and operation of the other solenoid operated valve delivering gas to the pressure transmitting means to move the gate in the reverse direction.

Automatic operation can be controlled by a time clock or by appropriate sensors detecting for example the level in a tank which has the penstock or gate valve as its outlet. Preferably the control signal from the sensor(s) or timer(s) passes to a sequence timer and starts a sequence of operations consisting of energizing the solenoid concerned, keeping it energized for a predetermined time, and then de-energizing it (or the converse in the case of a normally energized solenoid).

It is a further object of this invention to provide equipment which will fail-safe by going to (or remaining at) a pre-determined state if a supply of energy is not maintained. This supply of energy may constitute a power supply for the equipment, the equipment automatically going to a fail-safe condition if that power supply should fail or remaining in that condition if it is already there. For this there is provided apparatus for the supply of fluid pressure to fluid pressure operated actuating equipment having at least one chamber the supply of pressure to which induces actuation, the apparatus including a fluid conduit the supply of pressure along which effects, in use, the supply of pressure to the said chamber of the actuating equipment, a fluid pressure reservoir, a valve controlling the supply of fluid pressure to the conduit from the reservoir, the valve being normally maintained closed by a supply of energy to the equipment, and opening automatically if that supply is not maintained, thereby supplying fluid pressure from the reservoir to the said fluid conduit.

Where solenoid operated valves are used it can be arranged that the solenoid of the valve which operates to move the gate to the fail-safe position is normally energized, and operates if de-energized (then supplying gas from a reservoir).

The supply of electricity to the normally energized solenoid may be passed through a pressure-responsive switch connected to the inlet for the supply of compressed gas to the equipment so that the switch is maintained closed by the pressure of the gas supply at the inlet unless this drops below a predetermined value when the switch will open, de-energizing the solenoid so that it operates to move the gate to the fail-safe position, using gas from a reservoir.

It is a further object of the invention to prevent the fail-safe state being inadvertently overridden. To accomplish this the valve may control the supply of fluid pressure from the reservoir to the fluid conduit the supply of pressure along which induces actuation in the direction designated as fail-safe together with the supply of fluid pressure to fluid pressure operable means for preventing the supply of fluid pressure along the fluid conduit the supply of pressure along which would induce actuation in the reverse direction. In this way the actuating equipment is commanded to go to the designated fail-safe state, and that command cannot then be overridden e.g. by inadvertant operation of a manual control in ignorance of the interruption of the supply of energy, or by an automatic control which is continuing to function despite the interruption of the energy supply.

Gate valves and penstocks can require a greater force to effect part of the travel of the gate than the remainder. A frequently encountered example of this is a need for a much greater force to unseat the gate, that is to move it through a short distance at the beginning of its travel, than the force to move it for the remainder of its travel. The usual method of effecting sealing of a gate valve or penstock when it is closed is for its moving gate to be driven into sealing with its seating by a wedge action. The force required to unseat the gate will be greatly effected by the presence or absence of lubricants, by corrosion or fouling of the wedge surfaces and other contacting regions of the gate and its seat, and by the difference in the hydrostatic head of the liquid at either side of the gate. The force required to unseat the gate might well be double the force required to move it during the remainder of its travel, or even a good deal more than double.

It is still a further object of the invention to provide actuating equipment which can apply an enhanced force to the gate of the valve or penstock for part only of the travel of the gate. The invention achieves this object by providing actuating equipment having liquid valve means to seal off a volume which in use is filled with hydraulic liquid and consists at least of the chamber of the cylinder pressurization of which tends to effect the movement required and compression means to compress the hydraulic liquid within the said volume, and hence within the said chamber, the liquid valve means being operative to seal off the volume and hold it sealed off while the compression means compresses the liquid in the volume for effecting part of the movement and to admit liquid to the volume for effecting another part of the movement, the compression means being capable of generating a pressure in excess of that of the hydraulic liquid admitted through the liquid valve means, and hence applying an enhanced force to the gate. When movement takes place as a consequence of operation of the compression means, the compression will be relieved by the expansion of the chamber, and this will of course govern the pressure which is actually achieved by the action of the compression means.

An important use of the compression means is to start movement, the liquid valve means being operative to seal off the volume when the movement is to start, to hold it sealed off while the compression means compresses the liquid in the volume to start the movement, and thereafter to admit liquid under pressure to the volume to continue the movement. However, the part of the movement effected by the action of the compression means need not be the start of the movement; in particular it may be the final part of the movement, e.g. when enhanced force is required to effect a proper seating of the gate.

The compression means may be used to bring about only a small part of the travel of the gate, but in this way a greater force can be exerted during this small part than during the main part of the movement. This can avoid providing an otherwise unnecessarily forceful cylinder and piston (more expensive, more cumbersome and slower in operation than necessary). Where the compression means is used to start movement it can avoid the provision of an unnecessarily forceful cylinder and piston solely to provide an adequate force for starting movement.

The enhanced force may possibly be utilised only if a movement includes some particular section of travel of the gate, or may be utilised for part of every movement. Thus the enhanced force may be exerted on starting movement at any point along the travel of the gate, or only at a particular section of the travel, such as the beginning. Even if the enchanced force is required only at some particular section of the travel it may be expedient to allow it to be exerted when starting movement at any point along the travel. The enchanced force may be applied once only in any movement or may be applied repeatedly if this is needed. It is a further object of the invention to provide equipment which will apply the enhanced force automatically whenever required.

The compression means may include a member to be driven into the sealed off volume. This volume may include a vessel separate from the cylinder and provided with a plunger to be driven into it.

DESCRIPTION OF PREFERRED EMBODIMENTS

Figure 1:
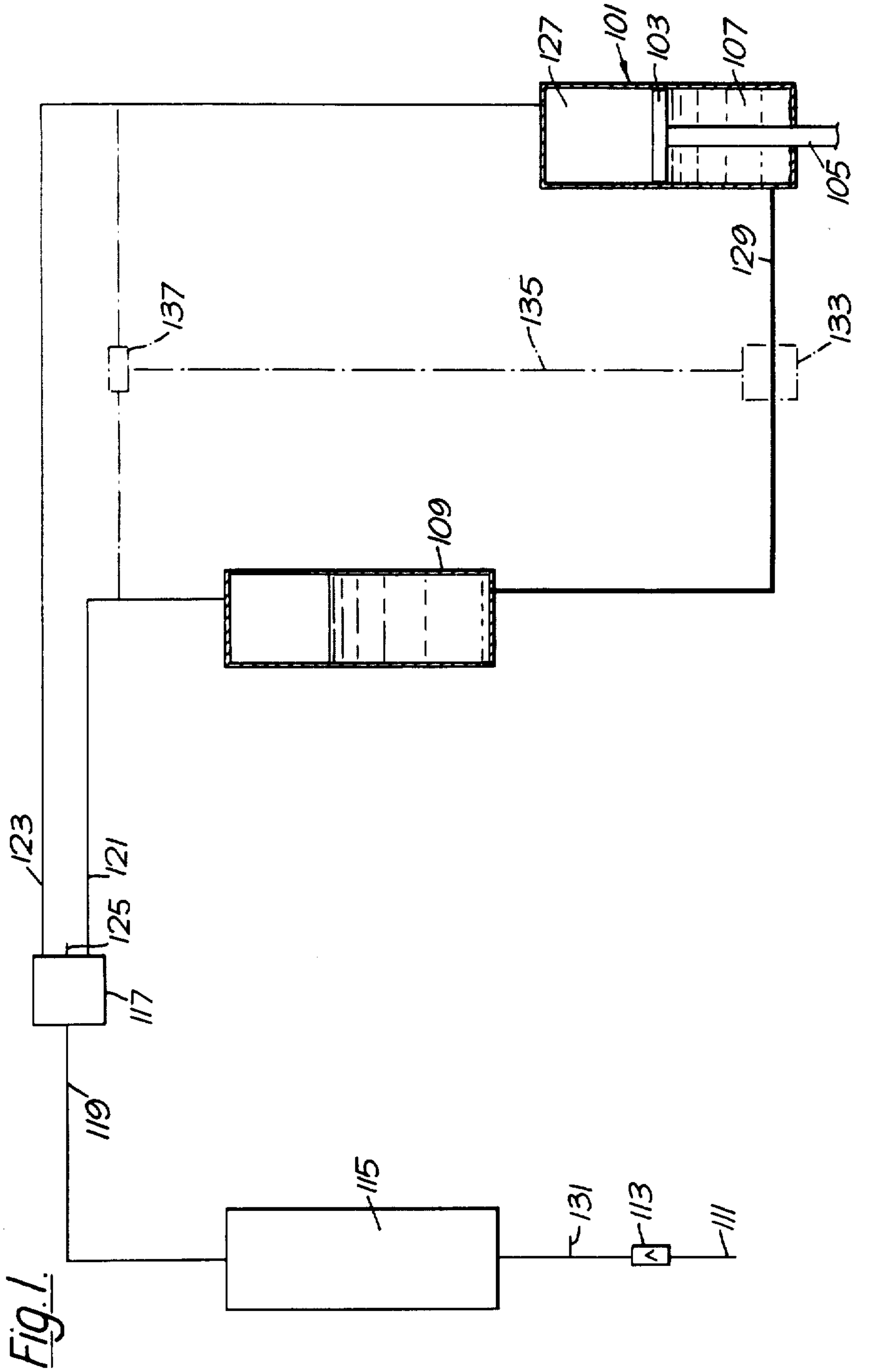
FIG. 1 is a diagram of a simple form of actuating equipment.

In FIG. 1 of the drawings a basic form of actuating equipment is shown. It has a double acting hydraulic cylinder 101 which would be mounted above a gate valve or penstock (assuming that the travel of the gate is vertical). The cylinder has a piston 103 and a shaft 105 to be connected to the gate of the gate valve or penstock. The piston 103 divides the cylinder 101 into a first (lower) chamber 107 which is supplied with hydraulic liquid, namely hydraulic oil from a oil reservoir 109 and a second (upper) chambe 127 which contains air. An inlet for a supply of compressed gas, namely compressed air is provided at 111, and the supply of compressed air is connected through a non return valve 113 to an air reservoir 115, which feeds control means, namely a manual control valve 117 via gas conduit 119. Further gas conduits 121 and 123 connect the valve 117 to the oil reservoir 109 and the second chamber 127 of the cylinder. Valve 117 has an operating knob with an inoperative normal position, but which can be pushed selectively to either of two positions. The first position is used for raising the gate; the conduit 119 is connected to the conduit 121 (and the conduit 123 is connected to an exhaust port 125 of the control valve). Air from the air reservoir 115 pressurizes the oil reservoir 109 and drives oil along the liquid conduit 129 into the chamber 107 of the cylinder 101. The chamber 127 of the cylinder 101 is free to exhaust at port 125. The other operative position of the valve is used for lowering the gate. The conduit 119 is connected to the conduit 123 and hence to the upper chamber 127 of the cylinder, while the conduit 121 is connected to the exhaust port 125 so that air can escape from the oil reservoir 109. In either case the speed of travel of the piston 103, and hence of the gate of the penstock or gate valve, is governed by the rate at which hydraulic oil can be driven along the liquid conduit 129 between the oil reservoir 109 and the chamber 107. If desired a flow restrictor can be incorporated in this liquid conduit 129 to reduce the speed of flow and hence the rate of movement of the gate.

The equipment of FIG. 1 is suitable for use where the gate of a valve or penstock is normally kept lowered, and the need will be to raise the gate, and keep it fully raised for a fairly short time, so that it is unobjectionable to maintain the hydraulic pressure which raised the gate in order to keep it raised.

The air reservoir 115 holds enough air to move the piston 103 along its full travel in one direction. This guards against the consequences of a failure of the compressed air supply. If its fails after the gate has been moved from its normal position to its abnormal position the air in the reservoir 115 can be used to return the gate to its normal position. On the other hand, if the air supply fails while the gate is in its normal position and it becomes essential to move the gate before the air supply is restored (e.g. to prevent overflow from a tank) the reservoir 115 will provide air for this. An air inlet 131, in the form of a Schrader type tire valve is provided for the connection of a foot pump as a last resort.

A modification to this equipment is shown by chain dotted lines. Liquid valve means 133 (referred to hereafter as a lock valve) is interposed between the oil reservoir 109 and the chamber 107. The valve 133 is normally closed to prevent the flow of hydraulic oil in either direction. However, it is operable by gas pressure, being opened if air is supplied along the gas conduit 135, and this conduit is connected through a shuttle valve 137 to each of the conduits 121 and 123 and hence to the control means 117. The function of a shuttle valve is to connect whichever of its input conduits that is pressurized to its output conduit. Thus the valve 137 functions to connect whichever of the conduits 121 or 123 that is pressurized to the conduit 135; when the control valve 117 is operated either to raise or to lower the gate, air is also supplied to the lock valve 133 to open it, and the gate can move. However, when the control valve 117 is returned to its inoperative position the valve 133 closes and prevents oil from flowing into or out of the chamber 107. The valve 133 thus functions to lock the gate at any position at which it comes to rest, and the operating equipment can be used for penstocks and gate valves which it may be desired to open either partially or fully and to hold for long periods.

Figure 2:
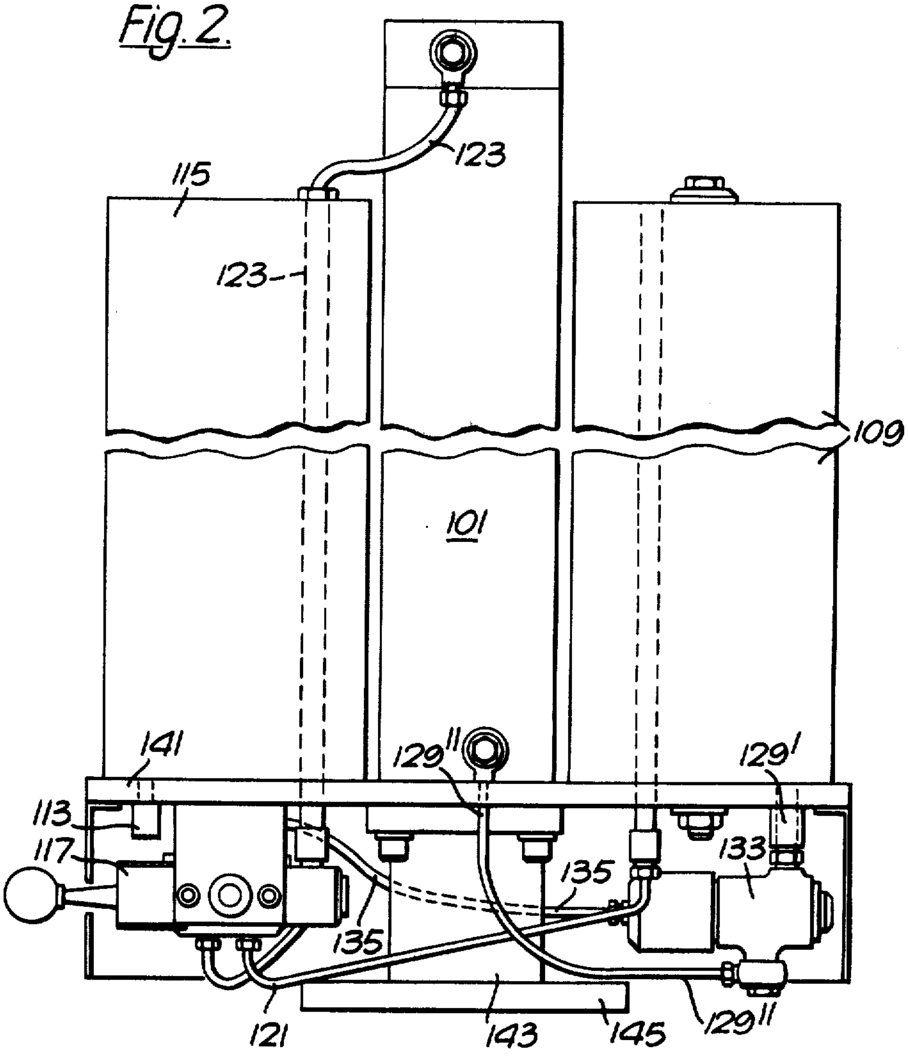
FIG. 2 is a view of the actuating equipment of FIG. 1.

The layout of such actuating equipment is shown in FIG. 2. It has the cylinder 101 disposed centrally, with the oil reservoir 109 at one side of it, and the air reservoir 115 at the other side. All three are mounted on a common supporting structure consisting of a base plate 141 supported on a block 143 through which the shaft 105 (not shown in FIG. 2) passes. The block 143 has a bottom flange 145 for attachment of the equipment above the gate valve or penstock.

The manual control valve 117, the lock valve 133, and the non-return valve 113 are located beneath the plate 141. The valve 117 is mounted by its ports directly onto a ported block (behind and obscured by the valve 117). This block has the shuttle valve 137 within it. It provides the exhaust port 125, and connections within it provide the gas conduit 119, gas conduits connecting the conduits 121 and 123 to the shuttle valve 137, and a connection from the valve 117 to the exhaust port 125. The gas conduit 123 is led up through the reservoir 115 (but does not communicate with it). The liquid conduit 129 is constituted by the rigid pipe 129' and the flexible hose 129''.

Figure 3:
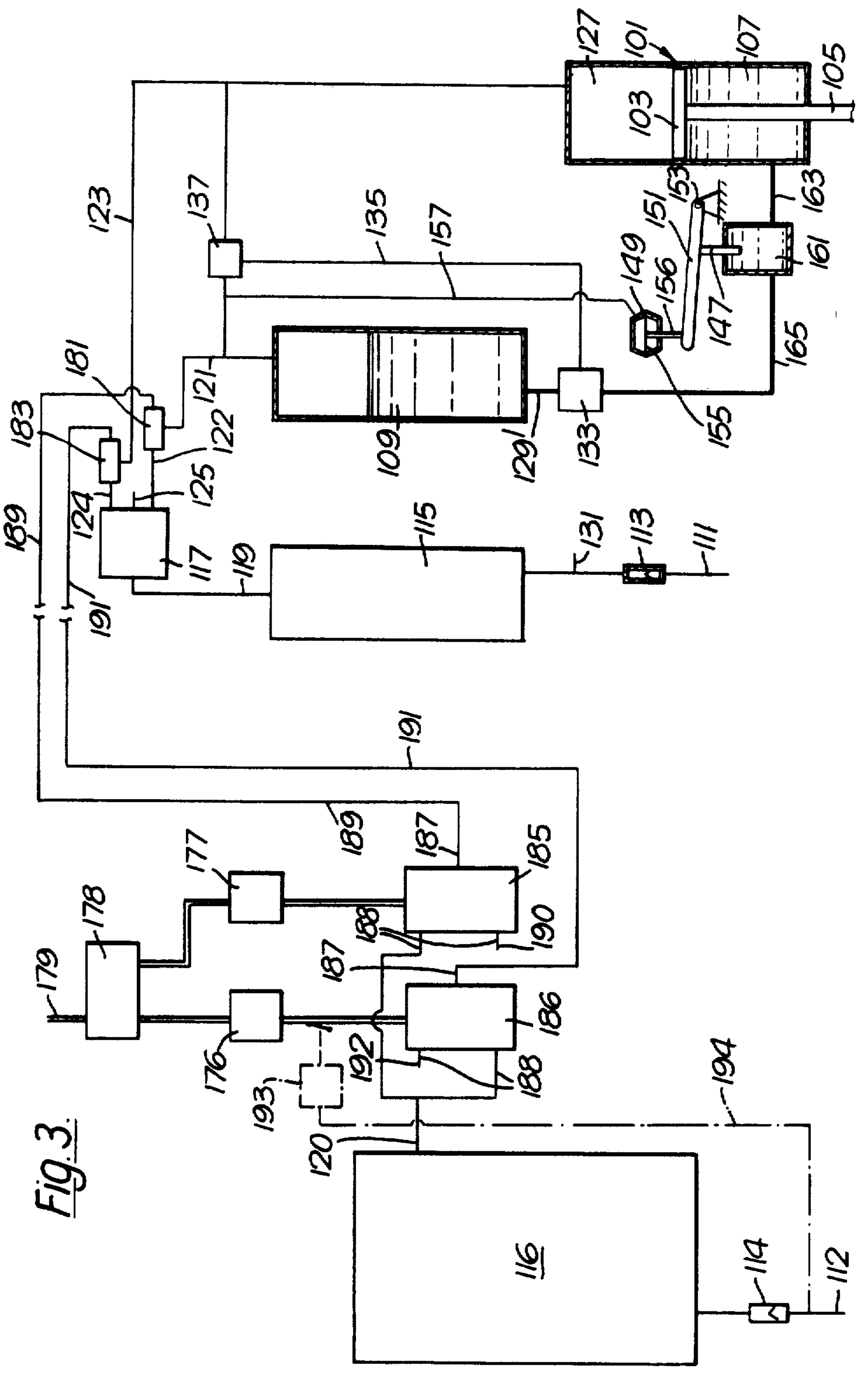
FIG. 3 is a diagram of a second form of actuating equipment.

FIG. 3 of the drawings shows equipment which is somewhat more elaborate. Like parts to those of FIGS. 1 and 2 are given the same reference numerals. This equipment has two sets of control means for moving the piston 103 and hence the gate of the penstock or gate valve.

The parts at the right hand side of FIG. 3 would form an assembly generally similar to that shown in FIG. 2 and mounted onto the gate valve or penstock. The assembly includes a manual control valve 117 connected by gas conduits 122 and 124 to shuttle valves 181 and 183 which deliver into the conduits 121 and 123. The shuttle valves would be included in the ported block mentioned earlier.

The parts at the left hand side of FIG. 3 are at a remote location; they include a large air reservoir 116 fed through an inlet 112 and a non return valve 114. The reservoir 116 is connected by a gas conduit 120 to control means in the form of a pair of solenoid operated valves 185, 186. Connection between the remote location and the assembly is provided by air pipelines 189, 191 which are connected to the shuttle valves 181, 183. These shuttle valves allow operation either by the manual control valve 117 or by the control means at the remote location. They prevent air from the pipelines 189, 191 exhausting along the conduits 122 and 124, and vice versa. If it were not desired to provide for manual operation at the site of the gate valve or penstock the manual control valve 117 could be dispensed with, and then of course, there would be no requirement for the shuttle valves 181 and 183, the pipelines 189 and 191 being directly connected to the gas conduits 121 and 123.

The solenoid operated valves 185, 186 are connected to respective sequence timers 176, 177 which are connected to one or more sensors and/or timers, e.g. a 24 hour clock indicated generally at 178. Connecton to an electricity supply is indicated at 179.

Each of the valves 185, 186 has a port 187 which is connected to one of alternative ports 188 when the solenoid is energized and is automatically connected to the other of them by a return spring when the valve is de-energized. It is desired that, as a fail-safe operation, the gate should be lowered in the event of failure of electrical power, and for this purpose the valve 185 is connected in a different manner to valve 186.

The valve 185 is not normally energized, and in this condition the line 189 is connected to the port 190 which functions as an exhaust.

Energizing of the solenoid of valve 185 is effected by the sequence timer 177 under the command of the clock 178. The timer 177 will respond to a signal from the clock 178 by going through an operating cycle consisting of energizing the solenoid of valve 185, maintaining it energized for a predetermined period and then de-energizing it. When the 185 is energized, air from the reservoir 116 is supplied along the line 189 to pressurize the conduit 121 and hence raise the gate.

The valve 186, on the other hand, is normally energized, in which state the line 191 is connected to the port 192 and hence is free to exhaust to atmosphere, but when the valve 186 is de-energized the return spring in the valve causes the line 191 to be pressurized from the reservoir 116 so pressurizing the conduit 123 and the chamber 127 and lowering the gate of the valve or penstock. The valve 186 is de-energized by a sequence timer 176 whose funcion is converse to that of the sequence timer 177. On receipt of a jsignal from the clock 178 the sequence timer de-energizes the solenoid valve 186, maintains it in a de-energized state for a pre-determined time and then re-energizes it.

The equipment will proceed to the desired fail-safe position in the event of failure of one source of energy connected to it, namely the electricity supply. In the evnet of failure of this the solenoid of valve 186 will necessarily become de-energized, and air pressure from the reservoir 116 will pressurize upper chamber 127 through the lines 191 and 123 to lower the gate and so fail-safe. The solenoid of valve 185 will also be de-energized, preventing pressurization of line 189.

The equipment can also be made responsive to failure of a second source of energy connected to it, namely the pressure of the air supply delivered to the reservoir 116 at the inlet 112 dropping below a predetermined level. For this purpose that air supply is connected along gas conduit 194 to a pressure operated electrical switch 193 as shown in chain dotted lines. In this switch the air pressure supplied along conduit 194 operates against a return spring, the latter tending to open the switch. As long as an adequate pressure is present, the switch is held closed, maintaining the electrical supply to the solenoid of the valve 186, but if the pressure is not maintained above a predetermined value (which depends on the strength of the return spring chosen) the switch is opened, which thereby causes the gate of the valve or penstock to be moved to the fail-safe position.

It will be appreciated that to move to the fail-safe position the equipment uses energy which is already stored in it viz. pressure held in the reservoir 116 by its non-return valve 114.

If it were desired that the fail-safe state were with the gate raised, the valve 185 would be kept normally energized, and of course connected appropriately, whereas the valve 186 would be normally de-energized.

The gate can be prevented from moving from its fail-safe position even if some while after movement to the fail-safe state, the air pressure in the reservoir 116 were to fall to a level sufficient to hold the gate in position. To do this the pressure needed to open the lock valve 133 is arranged to be as great as (or slightly greater than) that needed to hold the gate in its fail-safe position. If the air pressure is insufficient the lock valve will close, and so hold the gate (The valve 133 has a spring holding it closed against the pressure supplied along the conduit 135; the strength of the spring can be chosen to predetermine the pressure required to open the valve).

The parts at the right hand side of FIG. 3 include compression means for applying an enhanced force to the piston 103 and hence to the gate, on starting opening travel. This is chiefly for unseating the gate but it is expedient to allow it to be applied at other times also.

A liquid vessel 161 is interposed in the liquid conduit downstream of the liquid valve means constituted by the lock valve 133. The volume downstream of the lock valve 133 which this valve operates to seal off thus consists of chamber 107, vessel 161 and sections 163 and 165 of liquid conduit.

Compression means are provided for compressing the hydraulic oil in the volume sealed off by the lock valve 133. These compression means comprise a plunger 147 which can slide through seals (not shown) into the vessel 161, and a pneumatic thruster 149 and lever 151 for driving the plunger into the vessel 161, the lever being pivotally mounted at 153 to a rigid support.

The pneumatic thruster has upper and lower chambers separated by a flexible diaphragm 155 and acts as a cylinder with the diaphragm acting as a piston therein. The cross section of the diaphragm 155 is considerably greater than that of the plunger 147. The upper chamber of the thruster is connected to a gas conduit 157 branched from the conduit 121. The lower chamber of the thruster is open to the atmosphere.

When the conduit 121 is pressurized the pressure on the diaphragm 155 drives it and the thrust rod 156 attached to it downwards, driving the plunger 147 into the vessel 161, so reducing the size of the sealed off volume. For reasons which will be explained below the lock valve 133 will not yet have opened. It thus prevents flow back to the reservoir 109 and so the oil in the volume downstream of the lock valve, including the chamber 107, will be compressed and the piston 103 driven upwardly. Subsequently the lock valve 133 opens to admit oil from the reservoir 109 into the volume, and continue the upward travel of the piston 103.

The oil admitted from the reservoir 109 will be at the pressure of the compressed gas delivered along the conduit 121, but the pressure generated in the sealed off volume before the lock valve opens is greater (or at least will be if it is not relieved by movement of the piston 103) firstly because of the relative cross sections of the diaphragm 155 and the plunger member 147, and secondly because of the mechanical advantage provided by the lever 151. The force available to move the piston 103 will be crrespondingly enhanced. The travel of the piston 103 induced by this greater pressure will be only a small fraction of its full travel.

The delay in the opening of the lock valve 133 is brought about by arranging that the pressure to operate the thruster 149 is less than that to open the lock valve 133. (As already mentioned the valve 133 has a spring whose strength can be chosen to predetermine the air pressure required to open the valve). When the conduit 121 is pressurized the thruster 149 operates before sufficient air pressure has built up to open the valve 133. When the thruster has operated the pressure continues to rise until the lock valve 133 opens.

When the conduit 123 is pressurized the lock valve 133 will be opened to allow flow of oil back into the reservoir 109. At this time the conduits 157 and 121 will be free to exhaust, and the oil pressure in vessel 161 will urge the plunger 147 (and the parts 151, 155 and 156) upwardly. Thus any lowering of the piston 103 resets the means for compressing the oil in the sealed off volume. This will thus be able to operate after any lowering, whether partial or total, of the piston 103.

The fully lowered position of the piston 103, corresponding to the closed position of the gate, can of course be reached only by a lowering of the piston, and so the means for compressing the oil in the sealed off volume is always available for unseating the gate from its fully closed position. Moreover, it is fully available even if the gate does not always seat in exactly the same position on closure.

If desired a flow restrictor could be incorporated in one of the section of liquid conduit, to reduce the speed of travel.

Figure 4:
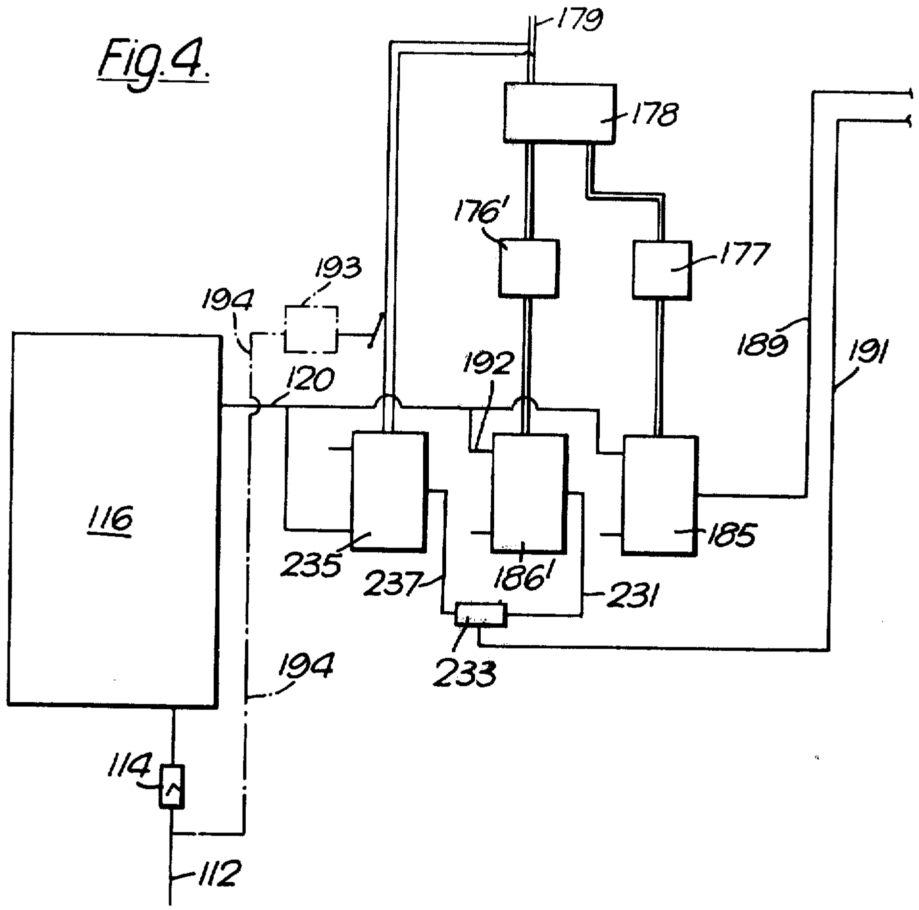
FIG. 4 shows a modification to the equipment of FIG. 3.

FIG. 4 shows a modification to the left hand side of FIG. 3. The valve 186' is not normally energized, and the sequence timer 176' has the same manner of operation as timer 177. When the solenoid of valve 186' is energized, pressure from the reservoir 116 is delivered via a conduit 231 to a shuttle valve 233 and hence into the line 191.

An additional solenoid operated valve 235 is provided. This is normally energized, but when it is de-energized through failure of the electricity supply 179, or opening of a pressure operated switch 193, it delivers air pressure from the reservoir 116 into a conduit 237 which also leads to the shuttle valve 233, and so delivers into the pipeline 191 and hence into the conduit 123 to move the piston 103 to its fail-safe position.

The equipment shown in FIG. 5 to 11 again has an assembly (right hand side of FIG. 5) at the site ofthe penstock or gate valve and other parts (left hand side of FIG. 5) at a remote location. The parts at the right hand side of FIG. 5 differ from those at the right hand side of FIG. 3 in that the oil reservoir 109 and the parts 133, 135, 137 and 147 to 161 are replaced by a combined oil reservoir and pressure intensifying unit 250 which will be described in detail later. Moreover, the reservoir 115 is not supplied by an air inlet at the location of the penstock or valve, and it is put to a somewhat different use. The air supply to it comes from the inlet 112, and is carried through a pipeline 211 from the remote location to the location of the penstock or gate valve. At the penstock or gate valve the pipeline 211 supplies the reservoir 115 through a non-return valve 213. It also supplies a pressure operable valve 215 which governs the outflow of air from reservoir 115. In this valve, the air pressure from the line 211 opposes the action of a return spring, which tends to open the valve 215 and allow discharge of compressed air into the conduit 217. The valve 215 is thus responsive to the supply of pressure along the line 211. As long as the pressure from the line 211 is greater than a predetermined value (which depends on the strength of the return spring used in the valve 215) the valve 215 is held closed and no air flows from the reservoir 115 into the conduit 217.

The conduit 217 is connected both to a shuttle valve 219 which allows the conduit 123 to be pressurized either via conduit 218 from the shuttle valve 183 or from the conduit 217, and also to means to prevent pressurization of chamber 107 this means consisting of another pressure opeable valve 221, in which pressure from the line 217 opposes a return spring. The valve 221 has a port 223 supplied from the shuttle valve 181, via gas conduit 220, a port 224 which is connected to the conduit 121, and a port 225 which is an exhaust. When the conduit 217 is not pressurized, the return spring causes the valve 221 to go to a condition in which the port 223 is connected to the port 224, so that the conduit 121 can be pressurized from the shuttle valve 181. However, when the conduit 217 is pressurized to overcome the action of the return spring the valve 221 goes to a condition in which the port 224 is connected to the exhaust port 225 and the conduit 121 is consequently free to exhaust. This condition is not affected by any pressure delivered from the shuttle valve 181, and consequently the pressure operable valve 221 prevents the conduit 121 and hence the chamber 107 from being pressurized.

The equipment functions as follows. As long as the pressure supplied along the pipeline 211 exceeds the predetermined value, the valve 215 remains closed, the ports 223 and 224 are connected and the equipment will function as in the manner described with respect to FIG. 3, being operable either automatically by the time clock 178 or by the manual control 117.

If the pressure in the pipeline 211 drops below the predetermined value, however, the pressure which is already in reservoir 115 (and retained there by virtue of non-return valve 213) is admitted via valve 215 to conduit 217 and consequently pressurizes conduit 123 moving the piston 103 and hence the gate of the gate valve or penstock to the fail-safe position. At the same time air from the conduit 217 operates the valve 221 so that the port 224 is connected to the port 225, thus providing an exhaust from the conduit 121 and preventing it, and hence the chamber 107, from being pressurized whether by operation of the manual control valve 117 in ignorance of the air pressure failure which prompted the equipment to proceed to its fail-safe condition, or by operation of the automatic control equipment at the remote location. It will be appreciated that the air reservoir providing the supply of fluid pressure to move the piston to the fail-safe position is constituted by the reservoir 115 which is in the assembly sited at the location of the penstock or gate valve. This provides protection against destruction of the communicating lines between that assembly and the remote location. Should these lines be destroyed, e.g. by mechanical damage or an outbreak of fire between the penstock or gate valve and the remote location, the destruction of them (causing loss of pressure in line 211) will cause the equipment to go to its fail-safe state even though communication with the remote location has been cut.

Again, it could be arranged, if desired, for the fail-safe state to be with the gate raised: the valves 219 and 221 would then be interchanged, so that the valve 221 connected shuttle valve 183 with the conduit 123 while the valve 219 was connected with shuttle valve 181 and delivered into the line 121.

Figure 5:
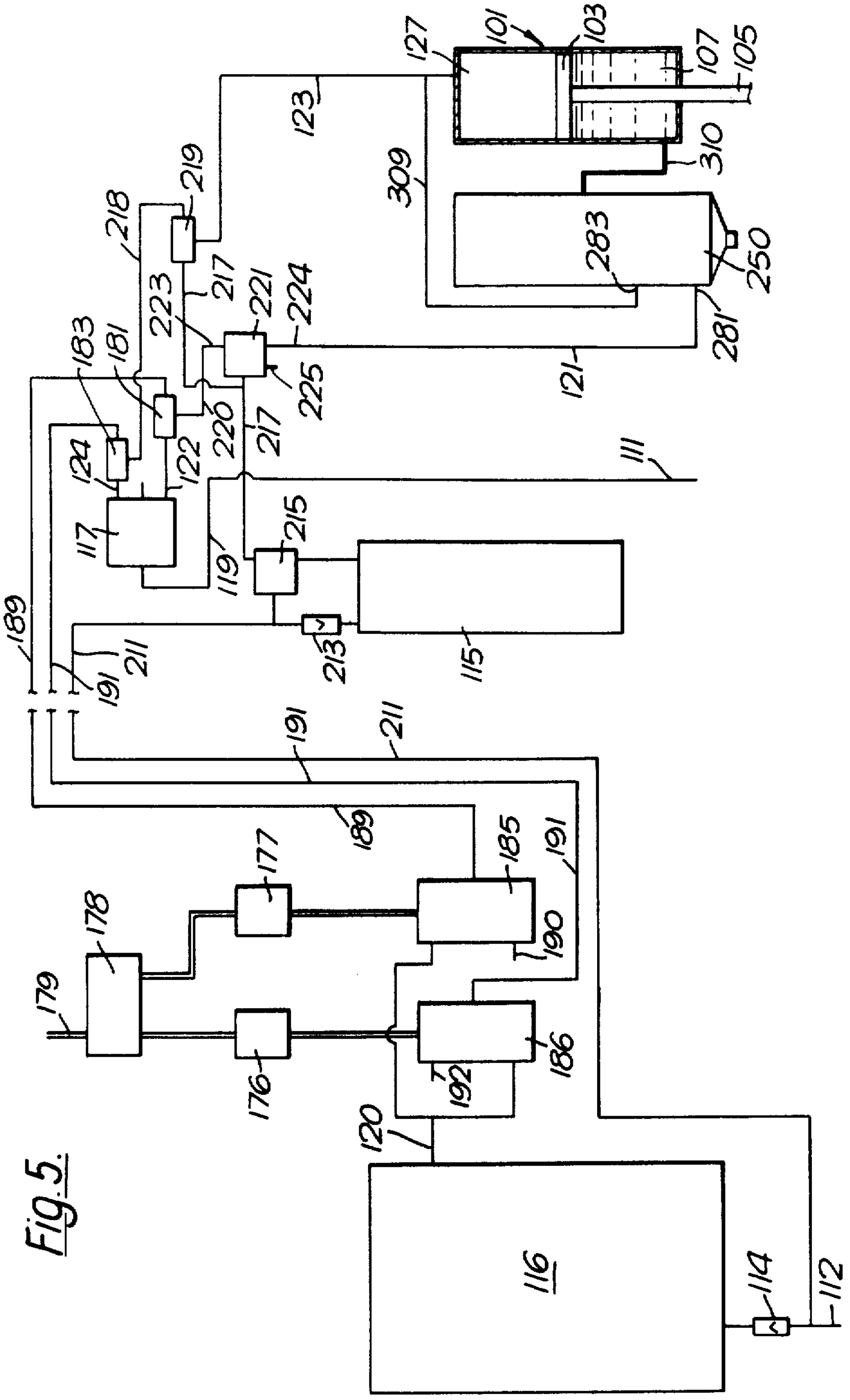
FIG. 5 is a diagram of a third form of actuating equipment.
Figure 6:
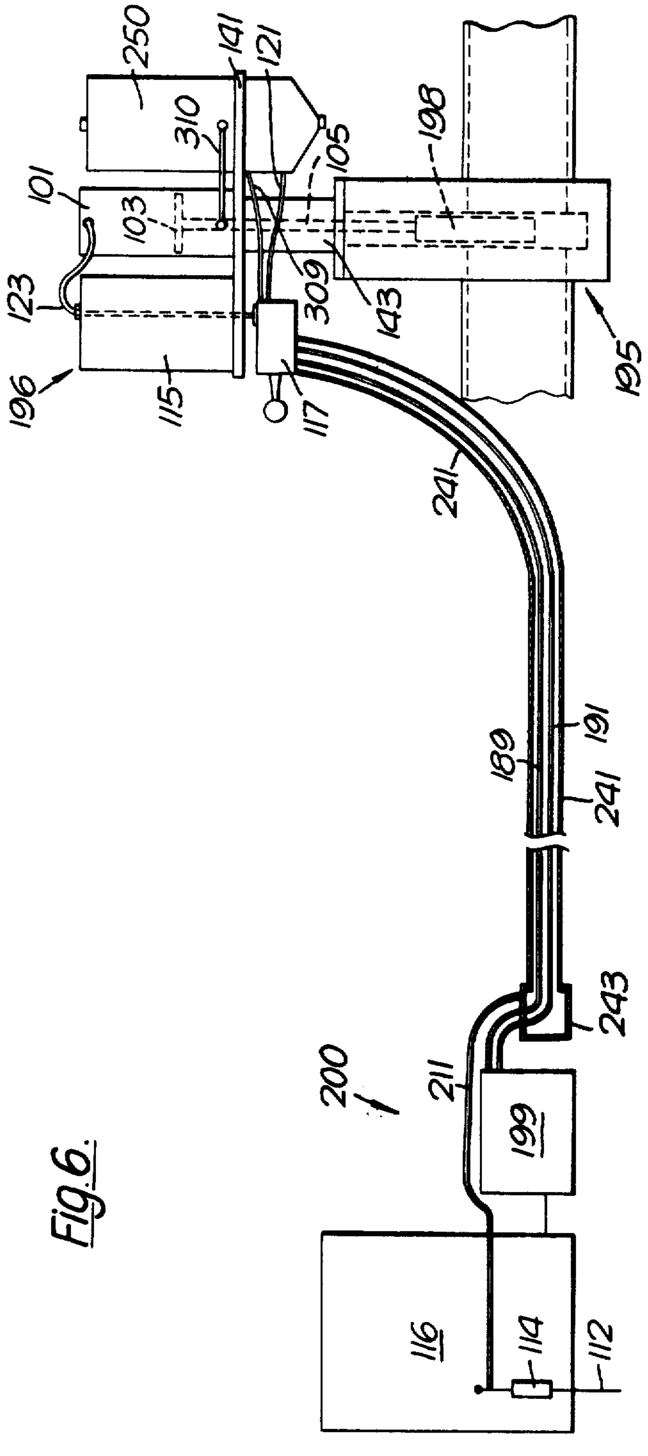
FIG. 6 shows a possible general layout of the parts of FIG. 5.

FIG. 6 shows a possible layout for the equipment shown in FIG. 5. The parts shown at the right side of FIG. 5 form an assembly 196 which is mounted above a gate valve 195. The cylinder 101 is disposed centrally with the combined oil reservoir and pressure intensifier 250 at one side of it and the air reservoir 115 at the other side. All three are mounted on a common supporting structure having a base plate 141 supported on a block 143 which is attached to the gate valve and through which the shaft 105 passes. This shaft is attached to the gate 198.

The manual control valve 117 and the valves 181, 183, 213, 219 and 221 (these not shown in FIG. 6) are suspended beneath the plate 141.

The sequence timers 176, 177 the time clock 178 and the solenoid operated valves 185, 186 are contained in a control box 199 at a remote location 200. The pipelines 189, 191 and 211 lead from this remote location to the assembly 196. A third solenoid operated valve 235 could be used as described with respect to FIG. 4, this valve and the shuttle valve 233 would also be contained in the control box 199. Between the remote location 200 and the assembly 196 the pipeline 211 is provided by tubing 241. This is of larger bore than the tubing used for the pipelines 189 and 191, and contains these two lines. In consequence it would be virtually impossible to damage either of the lines 189 or 191 at some point along the pathway between the remote location 200 and the assembly 196 without also damaging the line 211 (as constituted by tubing 241) which would cause the equipment to go to its fail-safe state.

The tubing 241 is terminated by air tight boxes 243 with fittings for leading out the lines 189 and 191. One such box is indicated diagrammatically in FIG. 6; another (not shown) would be provided in the assembly 197. Air tight boxes would also be used for connecting together lengths of the tubing 241.

Figure 7:
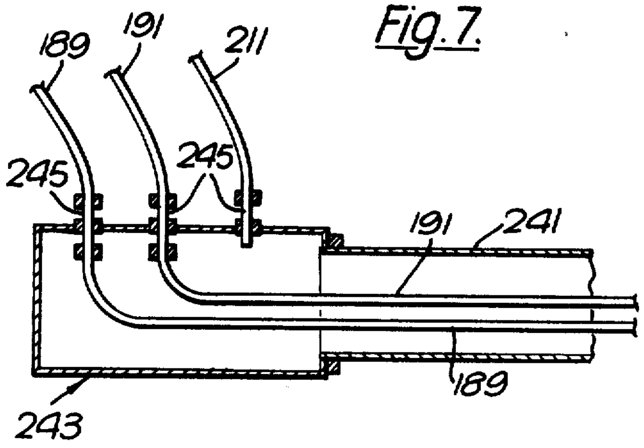
FIG. 7 shows a connection box.

A termination box 243 is shown in FIG. 7. It is sealed to the tubing 241, and is provided with three bulkhead fittings 245. One of these connects a length of the line 211 with the air space in the box, the other two connect lengths of the pipelines 189 and 191 with continuations of those lines which run within the tubing 241.

Figure 8:
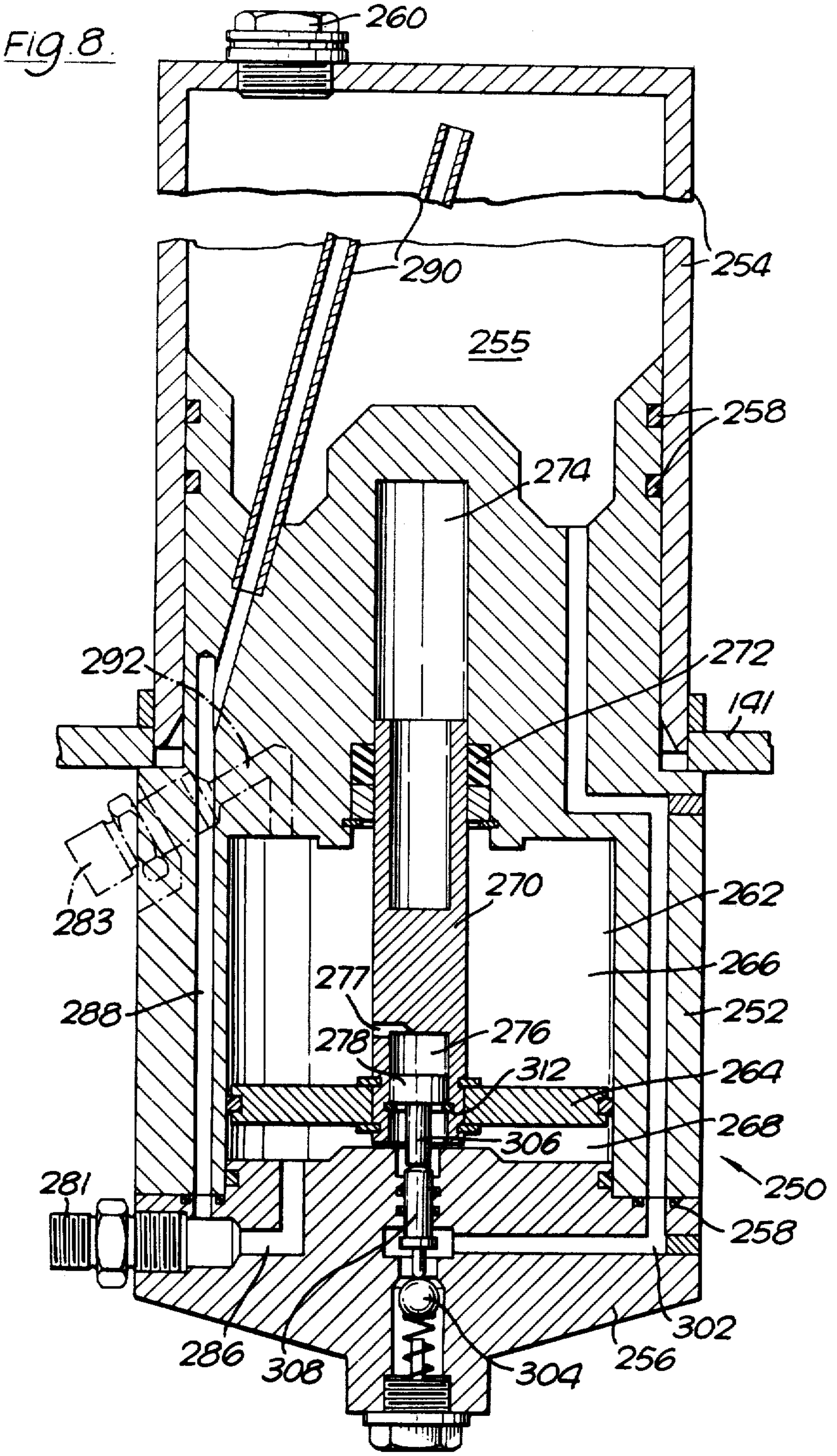
FIGS. 8 and 9 are cross sections of the combined oil reservoir and pressure intensifier unit of FIGS. 5 and 6 on the lines VIII—VIII and IX—IX respectively of FIG. 10, the inner piston being lowered in FIG. 8 and raised in FIG. 9.
Figure 9:
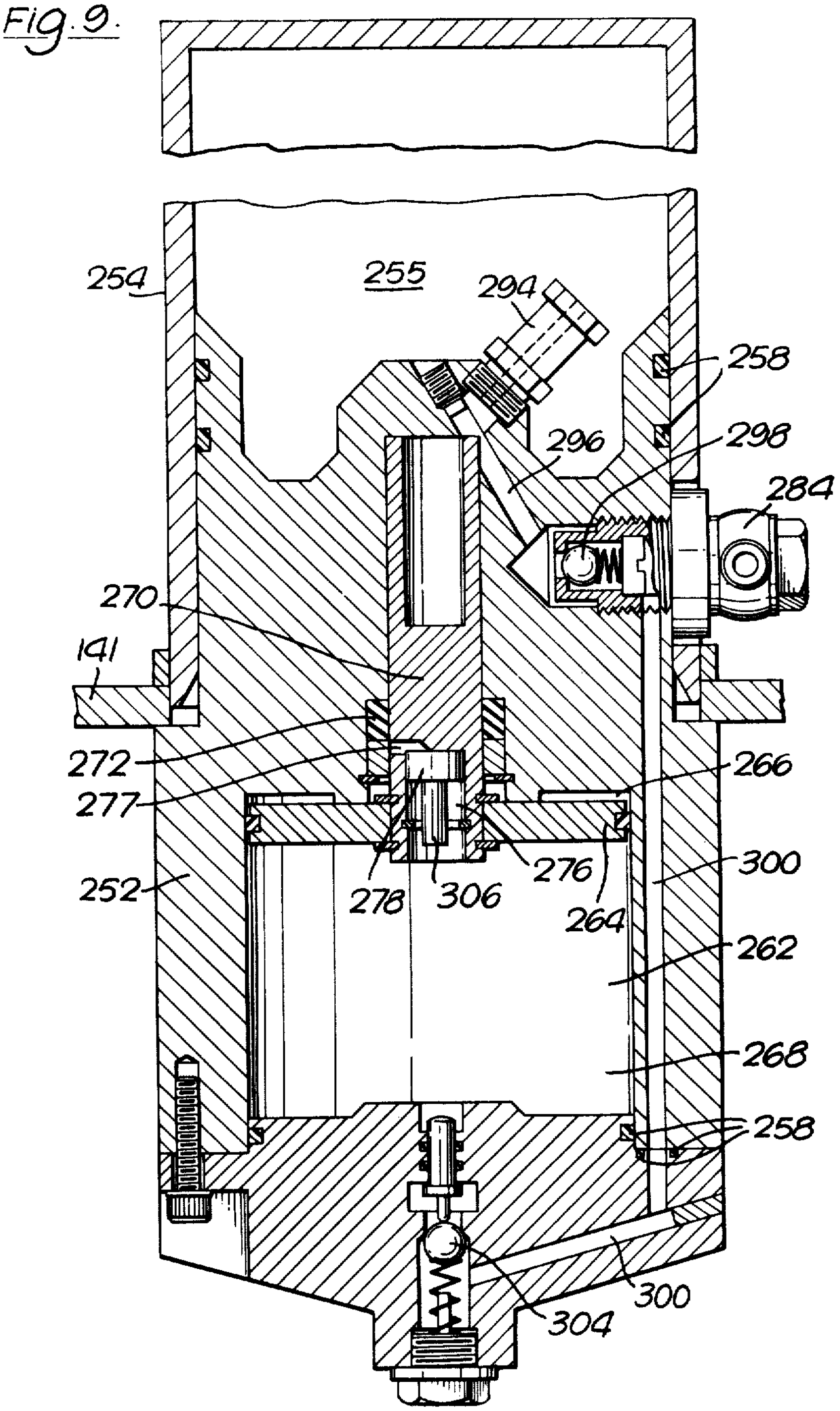
Figure 10:
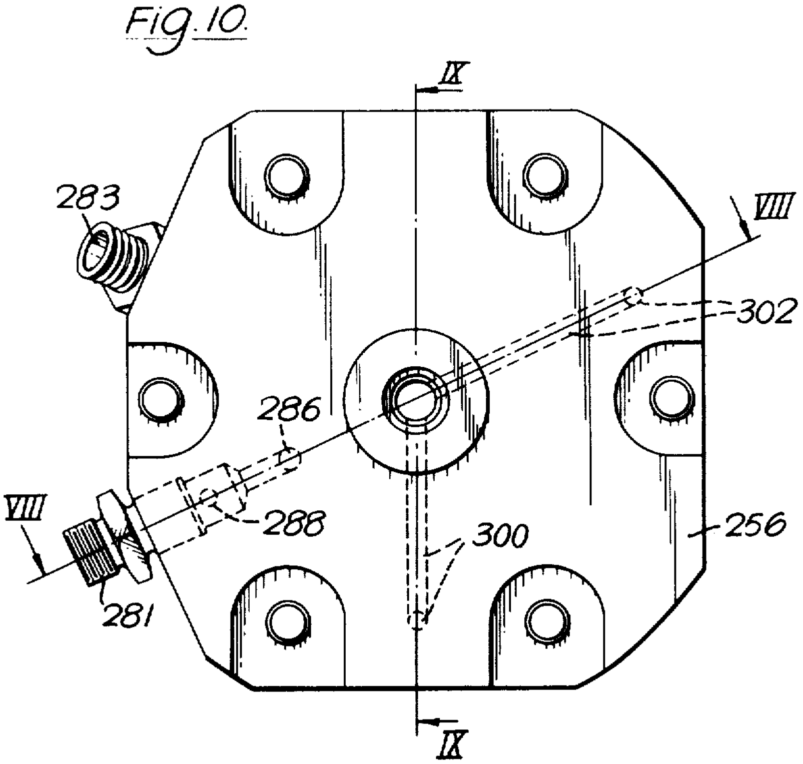
FIG. 10 is a diagrammatic underneath view of the unit.

Referring to FIGS. 8 to 10 the combined oil reservoir and pressure intensifier unit 250 has a main block 252, an upper casing 254 and a base 256 both secured to the main block 252 with seals 258 between them. The space 255 within the upper casing is the oil reservoir, and a filler plug 260 is provided.

The main block 252 contains a central cavity 262 constituting a double acting cylinder within which there moves a piston 264 dividing the cavity 262 into an upper chamber 266 and a lower chamber 268. The piston 266 carries a plunger 270 which extends through seals 272 in an oil vessel 274 which is of smaller cross section than the cylinder 262. Within the lower part of the plunger 270 a second cylinder 276 is formed. It is connected to the chamber 266 by a gas conduit 277 and within it there moves a small second piston 278.

A number of bores are formed in the block 252 and base 256 of the unit to provide gas and oil conduits. The unit has a first gas port 281, a second gas port 283, and a liquid port 284. The port 281 is connected by bores 286 and 288 to the lower chamber 268 of the cylinder 262 and to the gas space in the top of the oil reservoir 255, the bore 288 being extended by a pipe 290 for this purpose. The gas port 283 is connected by gas conduit 292 to the upper chamber 266 of the cylinder 262. The oil reservoir 255 is connected by a non-return valve 294 (FIG. 9) to the top of the oil vessel 274 and hence by liquid conduit 296 to a second non-return valve 298 connecting with the liquid port 284. The oil port 284 and the oil reservoir 255 are connected by respective bores 300 and 302 to a non-return valve 304 in the base 256 beneath the second piston 278. All three non-return valves are oriented so as to permit flow of oil from the reservoir 255 to the oil port 284, but prevent flow in the reverse direction. In the case of the valve 304, flow from reservoir 255 to port 284 is via bore 302 (FIG. 8), the valve 304 and bore 300 (FIG.9). The non-return valve 304, however, can be unseated by the piston 278 through it piston rod 306 and an intermediate sliding member 308. This enables reverse flow from port 284 to reservoir 255 via the unseated valve 304.

As shown in FIG. 5, the gas conduit 121 is connected to the gas port 281 and a gas conduit 309 connects the conduit 123 to the port 283. The liquid port 284 is connected to the chamber 107 of the cylinder by a liquid conduit 310. When air pressure is delivered along conduit 121 to the port 281 it is delivered to the oil reservoir by the gas conduit constituted by the bore 288 and pipe 290 and hence pressurizes the oil in that reservoir so as to drive it through the non-return valves 294 and 298—or alternatively through the non-return valve 304—to the port 284 and hence to the cylinder 107 to move the piston 103 and so raise the gate of the gate valve or penstock. At the same time air pressure is delivered by the bore 286 to the chamber 268 of the cylinder 262 to urge the piston 264 and the plunger 270 upwardly. The chamber 266 is free to exhaust via the gas conduits 292, 309 and 123. The air pressure drives the cylinder 262 from its lower position shown in FIG. 8 to its upper position shown in FIG. 9 thereby driving a small volume of oil from the vessel 274 through the valve 298 to the cylinder 107. The first non-return valve 294 prevents flow of this oil directly back to the reservoir 255 and the third non-return valve 304 prevents it from flowing to the reservoir by way of the liquid conduit constituted by the bores 300 and 302. Because the cross section of the piston 264 is greater than the cross section of the plunger 274 the oil driven from the vessel 274 can be at a greater pressure than the oil from the reservoir 255 (which is at the pressue of the compressed gas delivered via the gas conduit 121).

Consequently, when the control means is operated to move the gate in its upward direction an oil pressure greater than of the compressed gas can be generated in the chamber 107 by the action of the piston 264 driving the plunger 270 into the vessel 274. This will move the gate through only part of its travel, but after this oil at the pressure of the compressed gas can continue to flow from the reservoir 255 to the chamber 107 to effect the remainder of the travel. Thus, if the pressure of the compressed gas is inadequate to start movement of the gate, for example to unseat the gate from its fully closed position, an enhanced force is made available to initate movement.

When the control means is operated to lower the piston 103 and the gate, pressure is delivered along the gas conduit 123 to the chamber 127 and is also delivered via the conduit 309 and the port 283 to the chamber 266. This drives the piston 264 downwardly from its raised position (FIG. 9) to its lowered position (FIG. 8) and at the same time pressurizes the cylinder 276 to drive the small piston 278 down against its stop 312. This unseats the non-return valve 304 in the liquid conduit constituted by the bores 300 and 302 which by-passes the first and second non-return valves 294 and 298. Consequently, oil can flow from the cylinder 107 back through the unseated non-return valve 304 to the reservoir 255.

When the control means is not being operated to deliver pressure along either of the conduits 121 and 123, the valve means represented by the three non-return valves and the parts which function to unseat the non-return valve 304 operate so as to prevent flow from the chamber 107 back to the reservoir 255 thus preventing the gate from moving downwardly under its own weight. When the control means are operated to induce downward movement of the piston 103 and hence liquid flow in the direction which is normally prevented the compressed gas delivered from the control means causes the valve means to open (i.e. moves the cylinder 278 to unseat the non-return valve 304).

The equipment thus far described will function to apply the enhanced pressure once on starting each opening movement at least if that opening movement had been preceeded by a closing movement - as is necessarily the case if the opening movement begins from the fully closed position of the gate. However, this need not be the case if an oscillatory valve 320 is employed as shown in FIG. 11.

Figure 11:
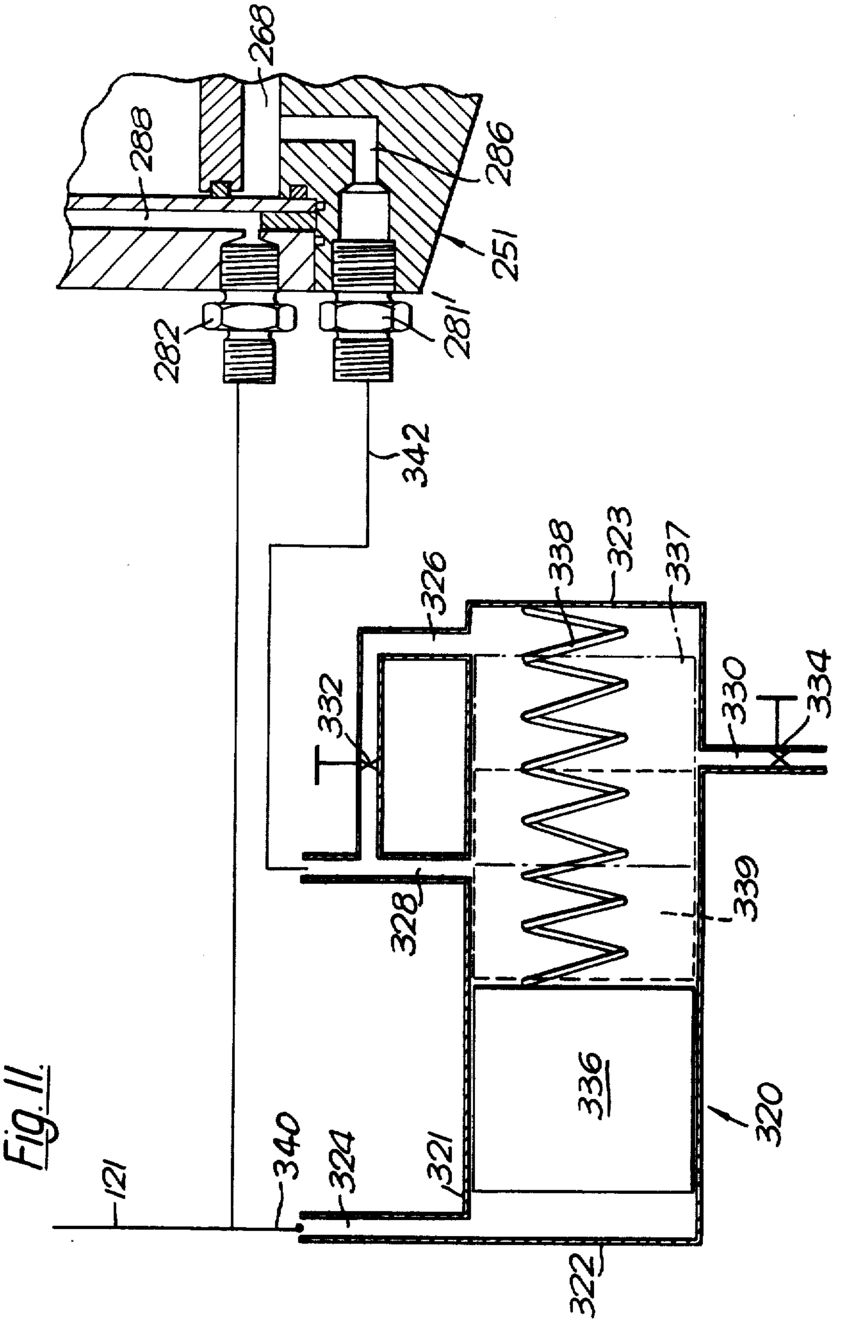
FIG. 11 shows a modification and includes a diagrammatic cross section of an oscillating valve.

The apparatus shown in FIG. 11 is a modification of that so far described with reference to FIGS. 5 to 10. It employs an oscillatory gas valve 320 which has a tubular valve body 321 provided with a primary inlet 324 at one end 322, a secondary inlet 326 at the other end 323, a primary outlet 328 between the two inlets, and a secondary outlet 330 somewhat closer to the secondary inlet than is the primary outlet 328. The primary outlet is connected to the secondary inlet 326 through a first needle valve 332, while the secondary outlet 330 is connected to atmosphere through a second needle valve 334. Within the body 322 there is a valve member 336 in the form of a piston and which is movable between a position at the end 322 (shown in solid lines) and a second position 337 at the end 323 shown by chain dotted lines. A spring 338 urges the valve member towards the position shown in solid lines.

When air is supplied to the primary inlet 324 it drives the valve member 336 against the spring 338 towards the position 337 and only when this is reached can air flow out at the primary outlet 328. Air pressure will be supplied via the first needle valve 332 to the secondary inlet 326 and when sufficient pressure has built up at the end 323 of the body 321 it will drive the valve member 336 back towards the end 322 of the body 321, closing off the primary oulet 328. The valve member 366 will be driven towards the end 322 at least as far as the position 339 shown in broken lines when pressure at the end 323 can exhaust through the secondary oulet 330 and the needle valve 334. The oscillatory valve will remain in this condition until the pressure at end 323 drops sufficiently for the pressure at end 322 (from the primary inlet 324) to overcome the remaining pressure at the end 323 combined with the force of the spring 338 and drive the piston back to its position 337.

The length of time which the valve member 336 remains in each of its rest positions 337 and 339 will depend on the setting of the needle valves 332 and 334. The setting of the first needle valve 332 will determine the time taken for pressure to build up at the end 323 of the body 321 and hence to move the valve member 336 back towards the end 322, first closing off the primary outlet 328 and then opening the secondary outlet 330. The setting of the second needle valve 334 would then determine the time for the pressure downstream of the first needle valve 332 (i.e. in the end 323 of the body 321) to exhaust sufficiently for the pressure at the end 322 to drive the valve member 336 from its position 339 back to its position 337.

The intensifier unit 251 in FIG. 11 is slightly modified from the unit 250 in FIGS. 8 to 10. Instead of the port 281 supplying both the bore 286 and the bore 288, a port 281' supplies bore 286 while a further port 282 supplies bore 288.

The gas conduit 121 is connected to the port 282 of the intensifier unit and hence to the gas space in the top of the oil reservoir 255. It is also connected to the primary inlet 324 of the oscillatory valve by a gas conduit 340. The primary outlet 328 of the oscillatory valve is connected by a gas conduit 342 to the port 281' and hence to the chamber 268 of the cylinder 262 of the intensifier unit 251.

The oscillatory valve 320 functions to interrupt temporarily the delivery of compressed air to the chamber 268, and to vent that chamber, allowing the plunger 270 to be expelled from the vessel 274. A compression spring is preferably located in the vessel 274 to assist explusion of the plunger. When the control means are operated to pressurize the conduit 121 the supply of pressure along the conduit 340 urges the valve member 336 to its position 337 when air can flow along the conduit 342 to pressurize the chamber 268 and drive the plunger 270 into the vessel 274. However, when the valve member goes to its position 339 the venting of the chamber 268 of the cylinder 262 through the oscillatory valve will allow the oil in the reservoir 255 to drive the plunger 270 and hence the piston 264 back to its position shown in FIGS. 8 and 11. Consequently, when the valve member 336 returns to its position 339, restoring delivery of air to chamber 268 the piston 264 and plunger 270 will have been reset ready for the re-application of an enhanced pressure to the chamber 107.

By appropriately setting the needle valves 332 and 334, together with appropriate choice of the strength of the spring 338, the intensifier unit 251 can be made to function in various ways. One possibility envisaged is to arrange that after the plunger 270 has been driven into the oil vessel 274 it will be reset very rapidly and again driven into the oil vessel. This would be appropriate if the enhanced force was required for a greater part of the travel of the gate of the penstock or gate valve than could be accomplished by driving the piston 270 once into the chamber 274. The oscillatory valve would allow the enhanced force to be applied repeatedly as required. (It would also be available at any point in the travel of the gate, being applied automatically whenever the pressure from the oil reservoir 255 was inadequate to move the gate). This arrangement would be suitable for opening a large penstock or gate valve with a large difference in the hydrostatic pressures at each side of the gate. Another possibility would be to arrange for the resetting of the plunger 270 and piston 264 to be relatively slow, so that they do not move up and down repeatedly while the gate is being moved through its travel but are available at the end of the travel. A particular use for such an arrangement would be when it was desired to drive a gate firmly home onto its seating at its fully closed position.

Figure 12:
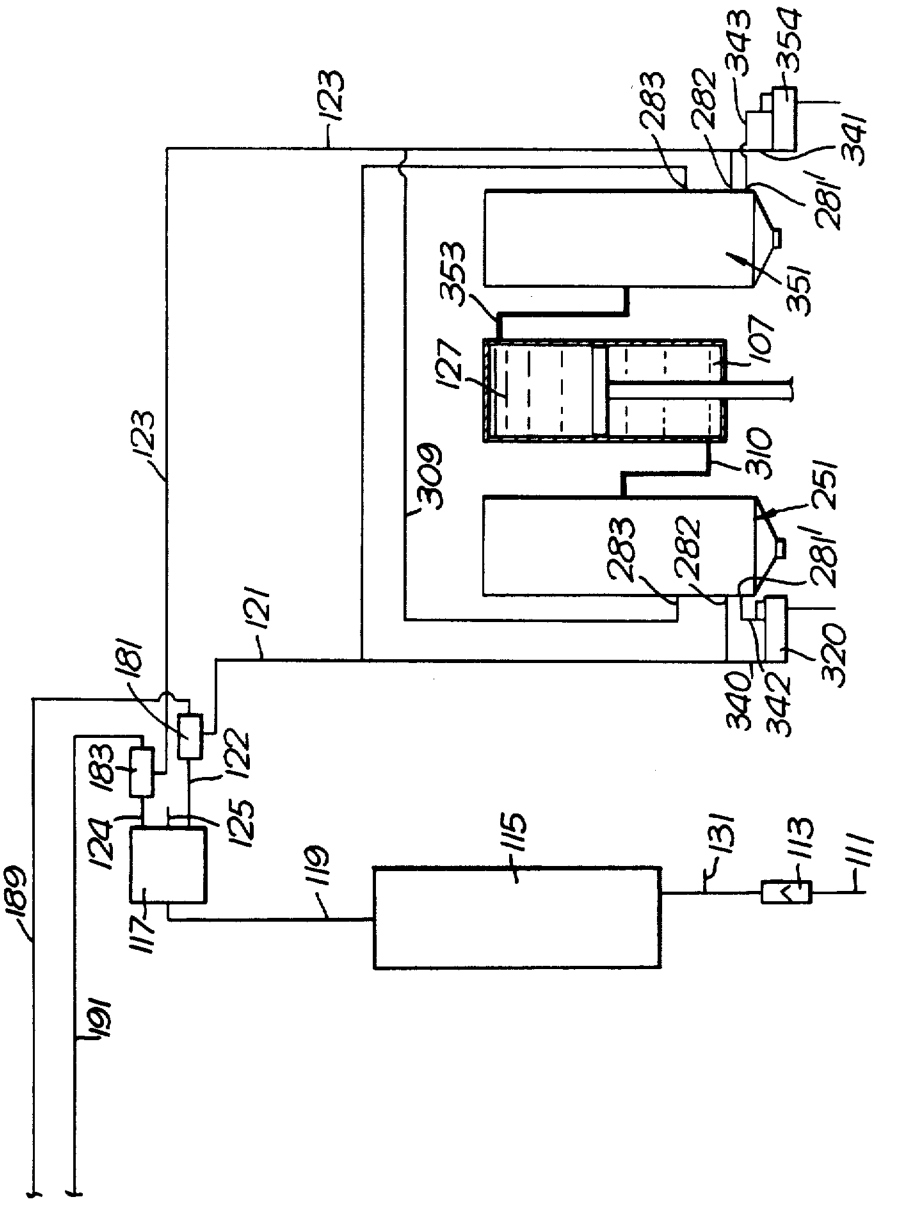
FIG. 12 is a diagram of actuating equipment having two intensifier units.

FIG. 12 is a diagram of those parts of an actuating equipment which are in the assembly at the site of the gate valve or penstock to which the equipment is connected. The parts at a remote location could, for example, be as in the left hand side of FIG. 3 or as in FIG. 4, and connected along the pipelines 189, 191 as previously described. This actuating equipment has two combined oil reservoir and pressure intensifier units both of which are as described in connection with FIG. 11. The unit 251 is connected by liquid conduit 310 to the chamber 107 of the cylinder 101. Its port 282 is connected to the gas conduit 121 and its port 281' is connected to the gas conduit 121 through the conduits 340, 342 and the oscillatory valve 320. The second reservoir and pressure intensifier unit 351 is connected by a liquid conduit 353 to the chamber 127 of the cylinder 101 and its ports 281' and 282 are supplied similarly by gas conduit 123, its port 281' being supplied via gas conduits 341, 343 and a second oscillatory valve 354. The manner of operation is as already described, operation of either control means to pressurize conduit 121 driving oil into the chamber 107 and operation of the control means to pressurize the gas conduit 123 pressurizing the chamber 127 although in this case instead of the chamber 127 being pressurized with compressed air it is pressurized with hydraulic oil from the unit 351. The needle valves of the oscillatory valve 320 are set so that for opening the gate an enhanced pressure can be repeatedly applied in chamber 107 whereas those of the oscillatory valve 354 are set so that the plunger 270 of the unit 351 does not reset rapidly and an enhanced pressure is applied in the chamber 127 on completion of the gate's travel so as to drive the gate of the penstock and gate valve home onto its seating.

When neither the conduit 121 nor the conduit 123 is being pressurized by operation of control means the piston 103 and hence the gate of the gate valve or penstock is completely locked, the non-return valves in the unit 251 preventing return flow from the chamber 107 into the reservoir of that unit and the non-return valves of the unit 351 preventing return flow from the chamber 127 into the reservoir of the unit 351.

If desired the plunger 270 of the unit 351 may be of a larger cross section than the plunger 270 of the unit 251, or the piston 264 of the unit 351 may be of smaller diameter than that of the unit 251 so that the enhanced force applied to seat the gate, although greater than the force applied to move it for the bulk of its closing travel, is less than the enhanced force available to unseat it.

Numerous modifications are possible. Other means could be employed to interrupt the supply of compressed air to the chamber 264 of a pressure intensifier unit. For example, the air supply to the chamber 264 could be independent from the supply to the oil reservoir 255 and under separate electrical control. An oscillatory valve might be used which was not wholly pneumatic. The air supply to the chamber 264 could be under the control of apparatus detecting the position of the gate being moved. If it should be preferred to provide communication between a remote location and the site of the penstock or gate valve by electric cable rather than by air pipelines (although the latter have advantages) solenoid operated valves could be provided as part of the assembly at the site of the gate valve or penstock.

I claim:

1. In combination, a valve having a gate reciprocally movable between a first end position and a second end position, and actuating equipment for the valve, said equipment comprising:

at least one cylinder and piston mechanically connected to the gate of the valve, said at least one cylinder and piston providing first and second cylinder chambers;

a first hydraulic liquid reservoir;

liquid conduit means connecting said first hydraulic liquid reservoir to said first chamber;

liquid valve means interposed in said liquid conduit means between said first hydraulic liquid reservoir and said first cylinder chamber, thereby defining a hydraulic volume downstream of said liquid valve means, said hydraulic volume including said firts chamber, said liquid valve means having a normally closed position so as to prevent flow of liquid in at least one direction between said hydraulic liquid reservoir and said hydraulic volume, and an open position, said liquid valve means being disposable in said open position in response to gas pressure;

a gas inlet for the supply therethrough of compressed gas to said equipment;

control means for said compressed gas;

gas conduit means connecting said gas inlet to said control means for connecting said control means to said first hydraulic liquid reservoir and to said liquid valve means; and pressure transmitting means connecting said control means to said second chamber;

said control means being selectively operable to permit passage of compressed gas to said first hydraulic liquid reservoir to pressurize it and thereby deliver liquid to said first chamber to pressurize said first chamber, and to permit passage of compressed gas to said pressure transmitting means to pressurize said second chamber, pressurization of said first chamber with hydraulic liquid inducing first movement of said at least one piston relative to said at least one cylinder to move the gate in one direction from said first end position to said second end position, the arrangement being such that delivery of hydraulic liquid to said first chamber is used for effecting movement of said gate in said one direction throughout substantially the whole travel of the gate from said first end position to said second end position, and pressurization of said second chamber inducing second movement of said at least one piston relative to said at least one cylinder to move the gate in the reverse direction from said second end position to said first end position;

said control means including means for inducing liquid flow normally prevented by said liquid valve means and permitting passage of compressed gas to said liquid valve means to open said liquid valve means and enable said flow.

2. The combination according to claim 1 wherein said pressure transmitting means comprises gas conduit means for delivering compressed gas to said second chamber.

3. The combination according to claim 1 wherein said pressure transmitting means comprises a second hydraulic liquid reservoir, gas conduit means connecting said control means to said second hydraulic liquid reservoir, and liquid conduit means connecting said second hydraulic liquid reservoir to said second chamber for delivering hydraulic liquid to said second chamber.

4. The combination according to claim 1, wherein said first and second chambers are chambers of a double acting cylinder and piston, and are separated from each other by said piston.

5. The combination according to claim 1 wherein said control means includes at least one solenoid operated valve and clock means electrically connected thereto to cause operation of said valve for a period of predetermined duration.

6. In combination, a valve having a gate reciprocally movable between a first end position and a second end position, and actuating equipment for the valve, said equipment comprising:

at least one cylinder and piston mechanically connected to the gate of the valve, said at least one cylinder and piston providing first and second cylinder chambers;

a hydraulic liquid reservoir;

liquid conduit means connecting said hydraulic liquid reservoir to said first chamber;

pressure intensifying means interposed in said liquid conduit means between said hydraulic liquid reservoir and said first cylinder chamber, said pressure intensifying means comprising:

a liquid vessel;

a first non-return valve between said first hydraulic liquid reservoir and said liquid vessel preventing flow from the vessel back to the reservoir;

a second non-return valve between said liquid vessel and said first cylinder chamber preventing flow from the chamber back to the vessel; and compression means comprising;

a plunger driveable into said vessel, and a first gas operable cylinder and piston to drive said plunger into said liquid vessel, said gas operable piston being of greater cross sectional area than said plunger, enabling said plunger to generate a liquid pressure greater than the pressure of gas acting on said gas operable piston;

a gas inlet for the supply therethrough of compressed gas to said equipment;

control means for said compressed gas;

gas conduit means connecting said gas inlet to said control means and connecting said control means to said gas operable cylinder; and pressure transmitting means connecting said control means to said second chamber;

said control means being selectively operable to permit passage of compressed gas to said gas operable cylinder to induce movement of said gas operable piston relative to said gas operable cylinder to drive said plunger into said liquid vessel to drive liquid from said reservoir to said first chamber of said at least one cylinder and piston, said control means also being selectively operable to permit passage of compressed gas to said pressure transmitting means to pressurize said second chamber, pressurization of said first chamber with hydraulic liquid inducing first movement of said at least one piston relative to said at least one cylinder to move the gate in one direction from said first end position to said second end position, the arrangement being such that delivery of hydraulic liquid to said first chamber is used for effecting movement of said gate in said one direction throughout substantially the whole travel of the gate from said first end position to said second end position, and pressurization of said second chamber inducing second movement of said at least one piston relative to said at least one cylinder to move the gate in the reverse direction from said second end position to said first end position.

7. The combination of claim 6, wherein said pressure transmitting means comprises a hydraulic liquid reservoir liquid conduit means connecting that hydraulic liquid reservoir to said second cylinder chamber, gas pressure operable pressure intensifying means interposed in the liquid conduit means between the hydraulic liquid reservoir and second cylinder chamber, and gas conduit means connecting said control means to said pressure intensifying means.

8. The combination according to claim 6 wherein said actuating equipment includes means to interrupt delivery of gas to said first gas operable cylinder and to vent said first gas operable cylinder to allow said plunger to withdraw from said vessel and thereafter to continue the delivery of gas, whereby a liquid pressure greater than that of the compressed gas can be repeatedly generated in the said first cylinder chamber.

9. In combination, a valve having a gate reciprocally movable between a first end position and a second end position, and actuating equipment for the valve, said equipment comprising:

at least one cylinder and piston mechanically connected to the gate of the valve, said at least one cylinder and piston providing first and second cylinder chambers;

a first hydraulic liquid reservoir;

liquid conduit means connecting said first hydraulic liquid reservoir to said first chamber;

a gas reservoir for compressed gas;

a non-return valve;

a gas inlet for the supply therethrough of compressed gas to said equipment;

control means for said compressed gas;

gas conduit means connecting said gas inlet through said non-return valve to said gas reservoir, connecting said gas reservoir to said control means, and connecting said control means to said first hydraulic liquid reservoir; and pressure transmitting means connecting said control means to said second chamber;

said control means being selectively operable to permit passage of compressed gas to said first hydraulic liquid reservoir to pressurize it and thereby deliver liquid to said first chamber to pressurize said first chamber, and to permit passage of compressed gas to said pressure transmitting means to pressurize said second chamber, pressurization of said first chamber with hydraulic liquid inducing first movement of said at least one piston relative to said at least one cylinder to move the gate in one direction from said first end position to said second end position, the arrangement being such that delivery of hydraulic liquid to said first chamber is used for effecting movement of said gate in said one direction throughout substantially the whole travel of the gate from said first end position to said second end position, and pressurization of said second chamber inducing second movement of said at least one piston relative to said at least one cylinder to move the gate in the reverse directon from said second end position to said first end position;

said control means comprising first and second solenoid operated valves and means for supplying electricity thereto, said gas conduit means connecting said first solenoid operated value to said first hydraulic liquid reservoir, and said pressure transmitting means connecting said second solenoid operated valve to said second chamber, one of said solenoid operated valves being normally de-energized and the other of them being normally energized whereby said other of them operates automatically upon cessation of the supply of electricity.

10. In combination, a valve having a gate reciprocally movable between a first end position and a second end position, and actuating equipment for the valve, said equipment comprising:

at least one cylinder and piston mechanically connected to the gate of the valve, said at least one cylinder and piston providing first and second cylinder chambers;

a first hydraulic liquid reservoir;

liquid conduit means connecting said first hydraulic liquid reservoir to said first chamber;

a gas reservoir for compressed gas;

a non-return valve;

a gas inlet for the supply therethrough of compressed gas to said equipment;

control means for said compressed gas;

gas conduit means connecting said gas inlet through said non-return valve to said gas reservoir, connecting said gas reservoir to said control means, and connecting said control means to said first hydraulic liquid reservoir; and pressure transmitting means connecting said control means to said second chamber;

said control means being selectively operable to permit passage of compressed gas to said first hydraulic liquid reservoir to pressurize it and thereby deliver liquid to said first chamber to pressurize said first chamber, and to permit passage of compressed gas to said pressure transmitting means to pressurize said second chamber, pressurization of said first chamber with hydraulic liquid inducing first movement of said at least one piston relative to said at least one cylinder to move the gate in one direction from said first end position to said second end position, the arrangement being such that delivery of hydraulic liquid to said first chamber is used for effecting movement of said gate in said one direction throughout substantially the whole travel of the gate from said first end position to said second end position, and pressurization of said second chamber including second movement of said at least one piston relative to said at least one cylinder to move the gate in the reverse direction from said second end position to said first end position;

said equipment further comprising:

gas pressure operable means to prevent pressurization of one of said cylinder chambers;

valve means governing outflow of gas from said reservoir to cause pressurization of the other of said cylinder chambers and at the same time to operate the said gas pressure operable means and thereby prevent pressurization of the said one chamber, the said valve means being responsive to a supply of energy so as to remain closed as long as said supply of energy is maintained and to open automatically upon cessation of said supply of energy.

11. The combination according to claim 10 wherein said at least one cylinder and piston, said first hydraulic liquid reservoir, said liquid conduit means connecting said first hydraulic liquid reservoir to said first cylinder chamber, said non-return valve, said gas reservoir, said gas pressure operable means to prevent pressurization of said one chamber, and said valve means governing outflow of gas from said gas reservoir are all located proximate one another in a common assembly;

said control means and said gas inlet being located remote from said assembly, three gas pipelines extending between said control means and said assembly, said three gas pipelines consisting of:

first and second gas pipelines connected to said control means, passage of compressed gas from said control means into said first and second pipelines causing pressurization of said first and second chambers respectively; and a third gas pipeline connecting said gas inlet to said non-return valve thereby to supply compressed gas from said inlet to said gas reservoir;

said valve means governing outflow of gas from said gas reservoir being responsive to gas pressure, gas conduit means within said assembly connecting said third gas pipeline to said valve means, whereby said valve means remains closed as long as the pressure in said third pipeline exceeds a predetermined value, and automatically opens if the pressure drops below the predetermined value.

12. The combination according to claim 11 wherein said first and second pipelines are contained within said third pipeline.

13. The combination according to claim 11, said equipment further comprising:

liquid valve means interposed in said liquid conduit means between said first hydraulic liquid reservoir and said first cylinder chamber, thereby defining a hydraulic volume downstream of said liquid valve means and including said first chamber; and compression means for compressing the liquid in the volume to a greater pressure than that of the compressed gas;

said compression means being operative for part of the first movement of said at least one piston within said at least one cylinder, said liquid valve means preventing flow of liquid from the volume back into said first hydraulic liquid reservoir at least while said compression means is operative, and admitting liquid to the volume from said hydraulic liquid reserovir for the remainder of said first movement of said piston.

14. The combination according to claim 13 having a liquid vessel downstream of said liquid valve means, said compression means comprising a plunger driveable into said vessel and urging means for driving said plunger into said vessel, gas conduit means connecting said urging means to said control means, said urging means being powered by compressed gas supplied through the gas conduit means and being at a mechanical advantage to said plunger to generate liquid pressure greater than the pressure of the compressed gas.

15. The combination according to claim 13 having a liquid vessel downstream of said liquid valve means, said compression means comprising a plunger driveable into said liquid vessel and a further cylinder and piston means to drive said plunger into said liquid vessel, gas conduit means connecting said further cylinder means to said control means to deliver gas to said further cylinder means and induce movement of its piston relative thereto and thereby drive said plunger into said liquid vessel, said further piston means being of greater cross sectional area than said plunger, enabling said plunger to generate a liquid greater than the pressure of the compressed gas.

16. In combination, a valve having a gate reciprocally movable between a first end position and a second end position, and actuating equipment for the valve, said equipment comprising:

at least one cylinder and piston mechanically connected to the gate of the valve, said at least one cylinder and piston providing first and second cylinder chambers;

a first hydraulic liquid reservoir;

liquid conduit means connecting said first hydraulic liquid reservoir to said first chamber;

a gas inlet for the supply therethrough of compressed gas to said equipment;

control means for said compressed gas;

gas conduit means connecting said gas inlet to said control means and connecting said control means to said first hydraulic liquid reservoir; and pressure transmitting means connecting said control means to said second chamber;

said control means being selectively operable to permit passage of compressed gas to said first hydraulic liquid reservoir to pressurize it and thereby deliver liquid to said first chamber to pressurize said first chamber, and to permit passage of compressed gas to said pressure transmitting means to pressurize said second chamber, pressurization of said first chamber with hydraulic liquid inducing first movement of said at least one piston relative to said at least one cylinder to move the gate in one direction from said first end position to said second end position, the arrangement being such that delivery of hydraulic liquid to said first chamber is used for effecting movement of said gate in said one direction throughout substantially the whole travel of the gate from said first end position to said second end position, and pressurization of said second chamber inducing second movement of said at least one piston relative to said at least one cylinder to move the gate in the reverse direction from said second end position to said first end position;

said equipment further comprising pressure intensifying means interposed in said liquid conduit means between said first hydraulic liquid reservoir and said first cylinder chamber, said pressure intensifying means comprising:

a liquid vessel;

a first non-return valve between said first hydraulic liquid reservoir and said liquid vessel preventing flow from the vessel back to the reservoir;

a second non-return valve between said liquid vessel and said first cylinder chamber preventing flow from the chamber black to the vessel; and compression means comprising;

a plunger driveable into said vessel, and a first gas operable cylinder and piston to drive said plunger into said liquid vessel, gas conduit means connecting said gas operable cylinder to said control means to deliver gas to said gas operable cylinder upon operation of the control means to pressurize said first hydraulic liquid reservoir, thereby to induce movement of said gas operable piston relative to said gas operable cylinder to drive said plunger into said liquid vessel, said gas operable piston means being of greater cross sectional area than said plunger, enabling said plunger to generate a liquid pressure greater than the pressure of the compressed gas;

whereby following operation of the control means to move the gate in its said one direction, a liquid pressure greater than that of the compressed gas can be generated in the first cylinder chamber to effect at least part of the travel of the gate in its said one direction, while alternatively liquid at the pressure of the compressed gas can flow from the first hydraulic liquid reservoir to the first cylinder chamber to effect any remainder of the travel, the equipment also having means for return flow comprising:

liquid by-pass conduit by-passing said first and second non-return valves;

liquid valve means in said by-pass conduit normally preventing flow at least from said first chamber back to said reservoir, and a second gas operable cylinder and piston to open the liquid valve means in said by-pass conduit;

gas conduit means connecting the second gas operable cylinder and piston to said control means to deliver gas to said second gas operable cylinder upon operation of the control means to pressurize said pressure transmitting means and hence pressurize said second cylinder chamber;

whereby on operation of the control means to move the gate in its reverse direction the second gas operable cylinder and piston opens the liquid valve means in said by-pass conduit to permit liquid flow from said first cylinder chamber back to said first hydraulic liquid reservoir.

17. The combination according to claim 16 having means to interrupt delivery of gas to said first gas operable cylinder and to vent said first gas operable cylinder to allow said plunger to withdraw from said vessel and thereafter to continue the delivery of gas, whereby a liquid pressure greater than that of the compressed gas can be repeatedly generated in the said first cylinder chamber.

18. The combination according to claim 17 wherein the said means to interrupt delivery of gas is an oscillatory gas valve interposed in said gas conduit means between said control means and said first gas operable cylinder, said oscillatory gas valve comprising:

a tubular valve body;

primary and second inlets at opposite ends of said valve body;

primary and secondary outlets intermediate said inlets, gas conduit means connecting said control means to said primary inlet and connecting said primary outlet to said first gas operable cylinder;

a valve member within the valve body between said primary and secondary inlets and moveable between first and second positions, said valve member in its said first position preventing gas flow from said primary inlet to any other said inlet or outlet and allowing flow between said secondary inlet and secondary outlet, said valve member in its second position preventing flow to said secondary outlet from any other said inlet or outlet and allowing flow between said primary inlet and said primary outlet;

spring means biasing said valve member to its first position;

a first needle valve connecting said primary outlet to said secondary inlet so as to allow restricted flow therebetween;

a second needle valve connecting said secondary outlet to atmosphere so as to allow restricted venting to atmosphere;

the arrangement being such that supply of gas from said control means to said primary inlet drives said valve member to its second position allowing delivery of gas via the primary outlet to said first gas operable cylinder until flow through the first needle valve and the secondary inlet builds up sufficient pressure to return the valve member towards its first position preventing further delivery via the primary outlet until venting via the secondary outlet allows the supply of gas from the control means again to move said value member to its second position.

* * * * *